United States Patent [19]

Numata

[11] 4,329,028
[45] May 11, 1982

[54] MEMORY LOCKING MEANS FOR DIGITAL EXPOSURE CONTROL DEVICE IN CAMERAS

[75] Inventor: Saburo Numata, Urawa, Japan

[73] Assignee: Fuji Photo Optical Co., Ltd., Omiya, Japan

[21] Appl. No.: 50,061

[22] Filed: Jun. 19, 1979

Related U.S. Application Data

[63] Continuation-in-part of Ser. No. 855,557, Nov. 29, 1977, abandoned, which is a continuation of Ser. No. 659,232, Feb. 19, 1976, abandoned.

[30] Foreign Application Priority Data

Feb. 25, 1975 [JP] Japan .................................. 50-23871

[51] Int. Cl.³ .............................................. G03B 7/08
[52] U.S. Cl. .................................. 354/23 D; 354/24; 354/50
[58] Field of Search .......................... 354/23 D, 24, 50

[56] References Cited

U.S. PATENT DOCUMENTS 3,992,098 11/1976 Wirtz ..................................... 354/50
3,995,284 11/1976 Kitaura et al. ........................ 354/24

Primary Examiner—Russell E. Adams, Jr.

[57] ABSTRACT

In a digital exposure control device for cameras including an A-D converter connected with a light measuring circuit and a memory element connected therewith for memorizing the output of the A-D converter, a one-shot is connected between the A-D converter and the memory element so that the output of the A-D converter will be transmitted to the memory element only while the output level of the one-shot is high.

6 Claims, 3 Drawing Figures

MEMORY LOCKING MEANS FOR DIGITAL EXPOSURE CONTROL DEVICE IN CAMERAS

CROSS-REFERENCE TO RELATED APPLICATIONS

This is a continuation-in-part of application Ser. No. 855,557 filed Nov. 29, 1977 now abandoned which is a continuation of application Ser. No. 659,232 filed Feb. 19, 1976 now abandoned.

BACKGROUND OF THE INVENTION

1. Field of the Invention

This invention relates to a memory locking means for an electric shutter in a photographic camera, and more particularly to a means for locking a memorized value in a memory element in a digital control type electric shutter for a photographic camera. The memory locking means in accordance with the present invention is also applicable to a diaphragm control device for a photographic camera wherein the aperture size of a diaphragm is electrically controlled.

2. Description of the Prior Art

In the conventional electric shutter or a diaphragm control device for a photographic camera, the shutter speed or the aperture size of the diaphragm is controlled in accordance with a terminal voltage of a memory capacitor provided in the camera. This type of shutter speed or diaphragm control device (hereinafter referred to as "exposure control device") suffers from a defect that the capacitor used for memorizing exposure information is automatically charged with the voltage at a predetermined moment. For instance, the exposure information is memorized and locked immediately before the swing-up of a swingable mirror in the camera. For example, as shown in U.S. Pat. No. 3,995,284 to Kitaura, the exposure information is memorized immediately before the shutter release operation. Therefore, the exposure is always controlled based on the scene brightness measured immediately before release of the shutter. This means that the exposure is always controlled as faithfully as possible to the actual scene brightness.

In the above described conventional exposure control device, it is impossible to automatically obtain desirable exposure for a special object illuminated by abnormal illumination, e.g. an object in the back-light, an object in the spot-light, etc.

SUMMARY OF THE INVENTION

The primary object of the present invention is to provide a locking means for fixedly locking at a desired moment the memorized information in a memory capacitor of an exposure control device for a camera.

Another object of the present invention is to provide a locking means for fixedly locking the memorized information in a memory capacitor for a digital type exposure control device for a camera which has a simple structure only employing an electric circuit to lock the memorized information and accordingly occupies a small space and operates silently.

Still another object of the present invention is to provide a locking means for fixedly locking the memorized information in a memory capacitor for a digital type exposure control device which can be reset only by turning off a power switch.

The memory locking means in accordance with the present invention employs a one-shot between an A-D converter and a memory capacitor of a digital type exposure control device. The one-shot operates to lock the memorized information upon closure or turning ON of a power switch made in response to the initial stage of the depression of a shutter release button. The one-shot makes the memory capacitor memorize the information given by the A-D converter while the one-shot is in its quasi-stable state, and stops the transmission of the information from the A-D converter to the memory capacitor when it returns from the quasi-stable state to its stable state. When the shutter release button is returned to its original position, the power switch is turned OFF and the one-shot is reset. Therefore, the memory capacitor holds its information recorded therein from the fall of the pulse generated by the one-shot until the turning OFF of the power switch. Thus, the exposure information can be memorized and locked at a desired moment just by half-depressing the shutter button. Accordingly, with the control device according to the present invention it is possible to take a picture of a back-light object with a proper exposure by first depressing lightly the shutter button with the camera faced to and located close to the object in the back-light, and then further depressing the shutter button all the way through to release the shutter after movement to a position to take the picture of the object together with the back-light.

DESCRIPTION OF THE PREFERRED EMBODIMENT

Figure 1:
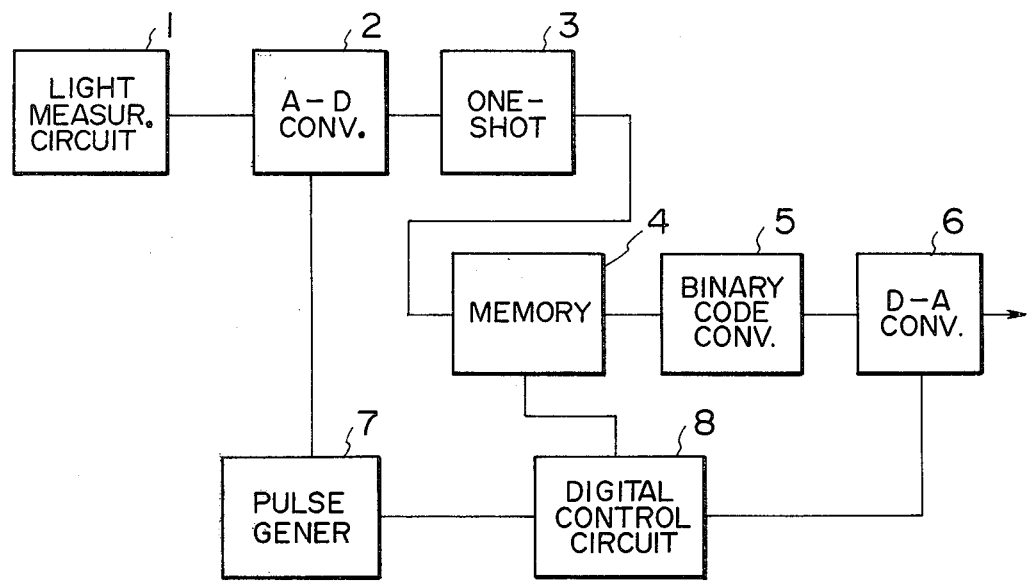
FIG. 1 is a block diagram showing an exposure control circuit employing the locking means in accordance with the present invention.

The basic circuitry of the exposure control device employing a memory locking means in accordance with the present invention is generally shown in FIG. 1 in block diagram. Referring to FIG. 1, a light measuring circuit 1 including a photodetector to measure the scene brightness is connected with an A-D converter 2 which converts an analogue output of the light measuring circuit 1 to a digital value. The A-D converter 2 is connected with a memory element 4 such as a memory capacitor by way of a one-shot 3 which is turned ON when a power switch is turned ON. The one-shot 3 is well known as a monostable multivibrator which generates a pulse of comparatively large pulse width with respect to the rise time or fall time. When the one-shot 3 is turned ON, it generates a pulse and the state of the circuit changes from the stable state to the quasi-stable state and makes the output of the A-D converter 2 memorized by the memory element 4. When the pulse generated from the one-shot 3 falls, the one-shot 3 stops passing the output of the A-D converter 2 to the memory element 4 therethrough. Therefore, the value memorized by the memory element 4 is locked thereafter. The one-shot 3 will hereinafter be described in detail with reference to FIGS. 2 and 3. In FIG. 1, the lines between blocks are illustrated merely for representation purposes. The number of lines between the A-D converter 2, one-shot 3 and memory 4 may be only one (as shown in FIG. 2) in case that the handled signal consists of a series of pulses the different number of which indicates different level of exposure information, and may be plural (as shown in FIG. 3) in case that the handled signal is a normal digital signal consisting of parallel digits.

The memory element 4 memorizes the output of the A-D converter 2 and gives an output based on the memorized value in accordance with a pulse generator 7 and a digital control circuit 8 connected between the A-D converter 2 and the memory element 4 in parallel with said one-shot 3 as well known in the art. A binary code converter 5 is connected with the memory circuit 4 to convert the output of the memory element 4 to a signal for controlling the shutter speed or the aperture size of the diaphragm. A D-A converter 6 is connected with the binary code converter 5 to convert the digital output of the converter 5 to an analogue value. The above described circuitry as shown in FIG. 1 is just equivalent to an exposure control circuit of a conventional exposure control device except that a one-shot 3 is connected between the A-D converter 2 and the memory element 4. Therefore, the detail description of the circuitry is omitted here.

Figure 2:
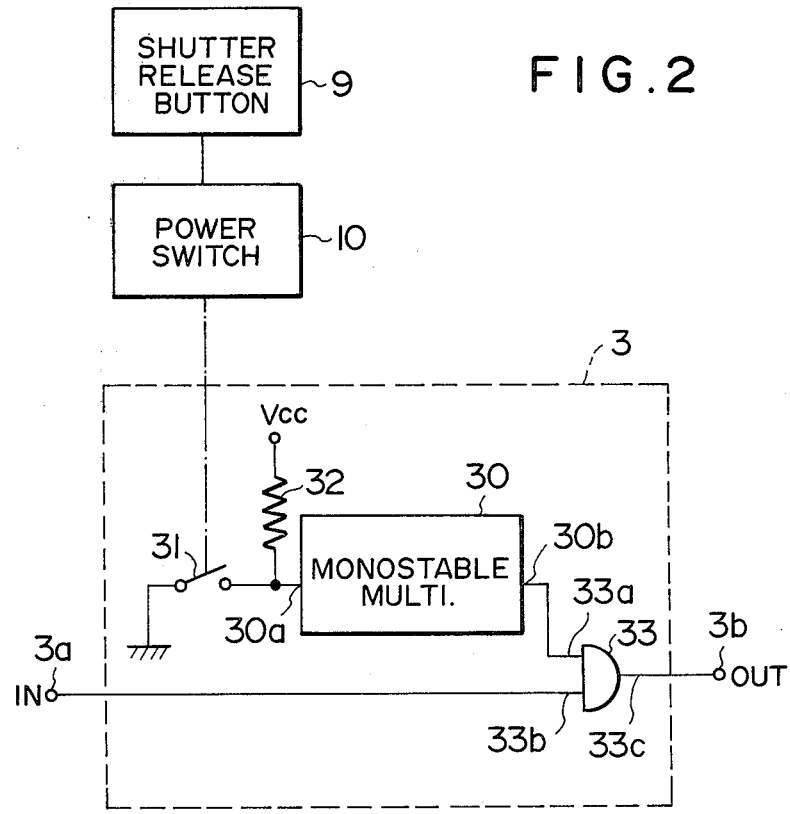
FIG. 2 is a circuit view of a memory locking means in accordance with an embodiment of the present invention.

Referring to FIG. 2 which shows the details of one example of the one-shot or a memory locking means 3 in accordance with the present invention, a monostable multivibrator 30 is connected with a trigger switch 31 at an input thereof 30a. The trigger switch 31 is associated with a power switch 10 to be turned ON and OFF together therewith. The power switch 10 is turned ON in response to the first stage of a shutter release button 9. A resistor 32 is connected with the input 30a of the monostable multivibrator 30 to constitute a trigger circuit of the monostable multivibrator 30 together with the trigger switch 31. The output 30b of the monostable multivibrator 30 is connected with a one input terminal 33a of an AND circuit 33. The other input terminal 33b of the AND circuit 33 constitutes an input terminal 3a of the one-shot or locking means 3 and the output terminal 33c of the AND circuit 33 constitutes an output terminal 3b of the one-shot 3. Therefore, the second output terminal 33b of the AND circuit 33 is connected with the A-D converter 2 and the output terminal 33c is connected with the memory element 4. The one-shot 3 is used for transmitting therethrough a signal from the A-D converter 2 to the memory when it is turned ON. The one-shot 3 as shown in FIG. 2 is used for transmitting a signal of the type that can be transmitted through a single line like a series of pulses the different number of which indicates the different level of exposure information. As the A-D converter 2 which gives such a serial output is known, for example, an A-D converter named "Am 2503" made by Advanced Micro Devices Inc.

Figure 3:
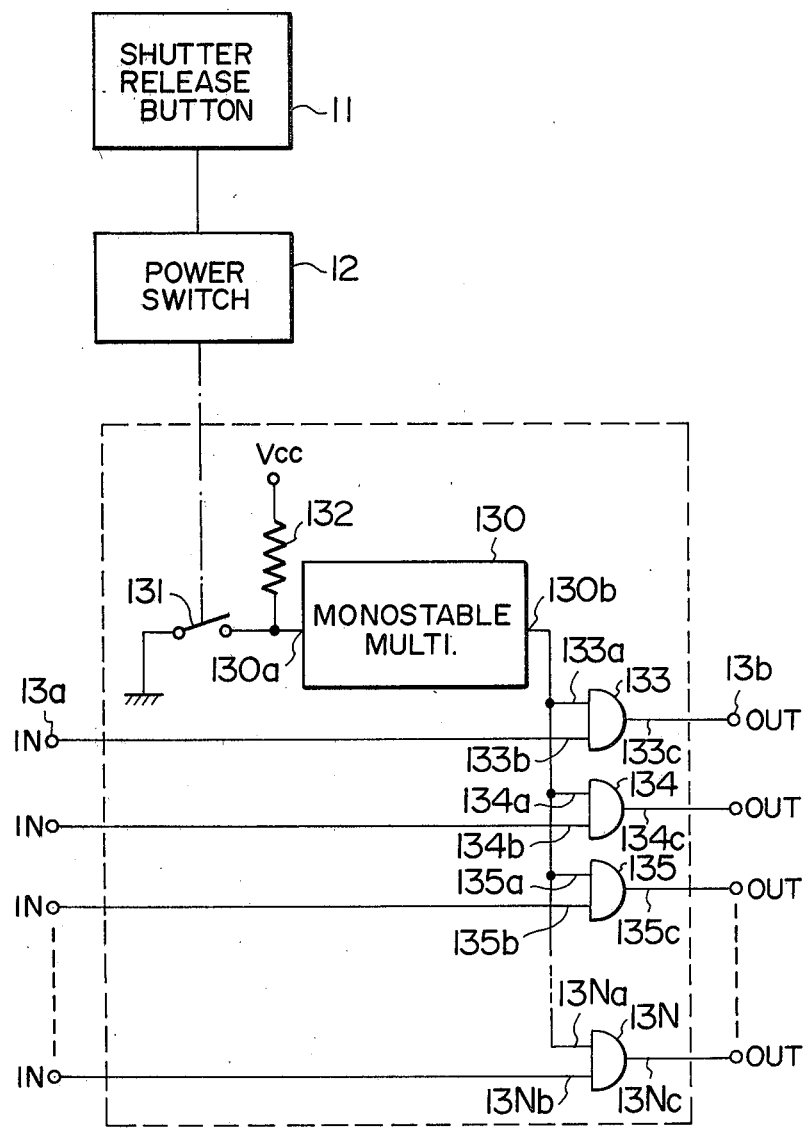
FIG. 3 is a circuit view of a memory locking means in accordance with another embodiment of the present invention.

When the A-D converter 2 is of the type that gives an ordinary digital output consisting of a number of parallel pulses the different combination of the levels of which indicates the different level of exposure information, a one-shot 3 as shown in FIG. 3 is used for instance.

Referring to FIG. 3 which shows the details of another example of the one-shot or a memory locking means 13 in accordance with the present invention, a monostable multivibrator 130 is connected with a trigger switch 131 at an input thereof 130a. The trigger switch 131 is associated with a power switch 12 to be turned ON and OFF together therewith. The power switch 12 is turned ON in response to the first stage of a shutter release button 11. A resistor 132 is connected with the input 130a of the monostable multivibrator 130 to constitute a trigger circuit of the monostable multivibrator 130 together with the trigger switch 131. The output 130b of the monostable multivibrator 130 is connected with input terminals 133a, 134a, 135a, ... 13Na of AND circuits 133, 134, 135, ... 13N. The other input terminals 133b, 134b, 135b, ... 13Nb of the AND circuits 133, 134, 135, ... 13N constitute input terminals 13a of the one-shot or locking means 13 and the output terminals 133c, 134c, 135c, ... 13Nc of the AND circuits 133, 134, 135, ... 13N constitute output terminals 13b of the one-shot 13. Therefore, the second output terminals 133b, 134b, 135b, ... 13Nb of the AND circuits 133, 134, 135, ... 13N are connected with the A-D converter 2 and the output terminals 133c, 134c, 135c, ... 13Nc are connected with the memory element 4.

Now the operation of the above described exposure control circuit employing the memory locking means or one-shot 3, 13 in accordance with the present invention will be described in detail. When the shutter release button 9, 11 of the camera is half depressed, the power switch 10, 12 is closed and the trigger switch 31, 131 associated therewith is closed to turn ON the monostable multivibrator 30, 130. Thus, the output level of the monostable multivibrator 30, 130 at the output 30b, 130b thereof is raised. Therefore, the digital output (The serial output consisting of a number of pulses as employed in FIG. 3 should be understood to be included in the "digital output" in this specification.) of the A-D converter 2 representing the output of the light measuring circuit 1 is transmitted to and memorized by the memory element 4 while the output level of the monostable multivibrator 30, 130 is high. When the output level of the monostable multivibrator 30, 130 falls by the fall of the pulse generated therefrom, the memorization of the output of the A-D converter 2 is stopped since the AND circuit 33, 133 is turned OFF by the fall of the output level of the monostable multivibrator 30, 130. Thus, the memorized value is held in the memory element 4, that is locked therein, and then the binary code converter 5 and the D-A converter 6 operate to provide an exposure control output in accordance with the memorized information held in the memory element 4. The memorized value or information is held until the power switch is turned OFF. Upon the turning OFF of the power switch, the monostable multivibrator 30, 130 is reset to be ready for the subsequent control.

In a digital exposure control device in which the value memorized in a memory element is refreshed every duty cycle by mean of a reset pulse given by a digital control circuit connected with the memory element, another one-shot is inserted between the memory element and the control circuit to prevent the automatic refreshment of the memorized value.

I claim:

1. In a digital exposure control device for a photographic camera including a shutter release button, a power switch of an exposure control circuit which is closed upon half depression of the shutter release button, a light measuring circuit for measuring the scene brightness, an A-D converter connected to said circuit for converting the output of the light measuring circuit to an output signal consisting of a series of pulses the number of which represents a digital value, a memory element connected to said converter for memorizing the output signal of the A-D converter, and a code converter for converting the output of the memory element to a value for controlling an exposure control means such as a shutter or a diaphragm, a memory locking means comprising a one-shot circuit means connected between said A-D converter and said memory element for transmitting the output signal of the A-D converter to the memory element only while the output level of the one-shot circuit means is high, said memory locking means comprising trigger circuit means for turning said one-shot circuit means on and off, the output level of said one-shot circuit being high only when it is turned on by said trigger circuit means, said trigger circuit means being associated with said power switch so that the trigger circuit is turned on when the power switch is closed upon half depression of the shutter release button.

2. A memory locking means as defined in claim 1 wherein said one-shot circuit means comprises a monostable multivibrator, a trigger circuit connected with an input of said monostable multivibrator, and an AND circuit having two input terminals and a single output terminal, one of said input terminals being connected with an output of said monostable multivibrator, the other of said input terminals being connected with said A-D converter, and said output terminal being connected with said memory element.

3. A memory locking means as defined in claim 2 wherein said digital exposure control device has a power switch and said trigger circuit includes a trigger switch which is closed upon closure of the power switch and opened upon opening of the power switch.

4. In a digital exposure control device for a photographic camera including a shutter release button, a power switch of an exposure control circuit which is closed upon half depression of the shutter release button, a light measuring circuit for measuring the scene brightness, an A-D converter connected to said circuit for converting the output of the light measuring circuit to an output signal consisting of a number of parallel pulses the combination of the level of which represents a digital value, a memory element connected to said converter for memorizing the output signal of the A-D converter, and a code converter for converting the output of the memory element to a value for controlling an exposure control means such as a shutter or a diaphragm, a memory locking means comprising a one-shot circuit means connected between said A-D converter and said memory element for transmitting the output signal of the A-D converter to the memory element only while the output level of the one-shot circuit means is high, said memory locking means comprising trigger circuit means for turning said one-shot circuit means on and off, the output level of said one-shot circuit being high only when it is turned on by said trigger circuit means, said trigger circuit means being associated with said power switch so that the trigger circuit is turned on when the power switch is closed upon half depression of the shutter release button.

5. A memory locking means as defined in claim 4 wherein said one-shot circuit means comprises a monostable multivibrator, a trigger circuit connected with an input of said monostable multivibrator, and a number of AND circuits each having two input terminals and a single output terminal, one of said input terminals being connected with an output of said monostable multivibrator, the other of said input terminals being connected with said A-D converter, and said output terminal being connected with said memory element.

6. A memory locking means as defined in claim 5 wherein said digital exposure control device has a power switch and said trigger circuit includes a trigger switch which is closed upon closure of the power switch and opened upon opening of the power switch.

* * * * *